(12) United States Patent
Yokoyama (10) Patent No.: US 11,971,292 B2
(45) Date of Patent: Apr. 30, 2024

(54) COMBINATORIAL WEIGHING DEVICE

(71) Applicant: Yamato Scale Co., Ltd., Hyogo (JP)

(72) Inventor: Shinya Yokoyama, Hyogo (JP)

(73) Assignee: Yamato Scale Co., Ltd., Hyogo (JP)

( * ) Notice: Subject to any disclaimer, the term of this patent is extended or adjusted under 35 U.S.C. 154(b) by 469 days.

(21) Appl. No.: 17/286,111

(22) PCT Filed: Dec. 10, 2019

(86) PCT No.: PCT/JP2019/048221
§ 371 (c)(1),
(2) Date: Apr. 16, 2021

(87) PCT Pub. No.: WO2020/122052
PCT Pub. Date: Jun. 18, 2020

(65) Prior Publication Data
US 2021/0381879 A1    Dec. 9, 2021

(30) Foreign Application Priority Data

Dec. 14, 2018 (JP) ................. 2018-233977

(51) Int. Cl.
*G01G 19/393* (2006.01)
*G01G 21/22* (2006.01)

(52) U.S. Cl.
CPC .......... *G01G 19/393* (2013.01); *G01G 21/22* (2013.01)

(58) Field of Classification Search
CPC ............................. G01G 19/393; G01G 21/22
USPC ......................................................... 177/66
See application file for complete search history.

(56) References Cited

U.S. PATENT DOCUMENTS

| 4,618,013 A * | 10/1986 | Yamano ................. G01G 19/32 |
| | | 177/1 |
| 6,762,371 B2 * | 7/2004 | Yamanaka ........... G01G 19/393 |
| | | 177/25.18 |
| 6,797,055 B2 * | 9/2004 | Yonetsu ............... G01G 19/393 |
| | | 177/25.18 |
| 2002/0096370 A1 * | 7/2002 | Yonetsu ............... G01G 19/393 |
| | | 177/25.18 |
| 2021/0354930 A1 * | 11/2021 | Suemichi ............... B65G 27/34 |
| 2021/0372848 A1 * | 12/2021 | Suemichi ............. G01G 19/387 |
| 2021/0381878 A1 * | 12/2021 | Yokoyama ........... G01G 19/393 |

(Continued)

FOREIGN PATENT DOCUMENTS

| JP | 5-330632 A | 12/1993 | |
| JP | 4669627 B2 * | 4/2011 | ........... G01G 19/393 |
| JP | 2012-237576 A | 12/2012 | |

(Continued)

*Primary Examiner* — Jacques M Saint Surin
(74) *Attorney, Agent, or Firm* — Norris Mclaughlin, P.A.

(57) ABSTRACT

The vibration strength of a linear feeder is changeable depending on whether an article is currently present at a downstream end of a trough of the linear feeder. When articles continue to be vibrationally transported, arriving continuously at the downstream end of the trough of the linear feeder, the vibration strength is set to a vibration strength suitable for discharge of the articles from the downstream end. When there is currently no article at the downstream end of the trough of the linear feeder, the vibration strength is set to a vibration strength suitable for transport of the articles to allow the articles that follow to swiftly arrive at the downstream end of the trough.

5 Claims, 10 Drawing Sheets

Front-back direction (56) References Cited

U.S. PATENT DOCUMENTS

2021/0389169 A1* 12/2021 Suemichi ............. G01G 19/387
2021/0389170 A1* 12/2021 Yamada ................ G01G 21/28

FOREIGN PATENT DOCUMENTS

| | | |
|---|---|---|
| JP | 2016-148557 A | 8/2016 |
| JP | 2018-077074 A | 5/2018 |
| JP | 2018-184260 A | 11/2018 |
| WO | 2004/042335 A1 | 5/2004 |
| WO | WO-2015108117 A1 * | 7/2015 ............. G01G 19/00 |

* cited by examiner

FIG. 1

Front-back direction

Lateral direction

FIG. 4

Front-back direction

COMBINATORIAL WEIGHING DEVICE

TECHNICAL FIELD

The present invention relates to a combinatorial weighing device for use in mixing and weighing certain quantities of articles, for example, food stuffs including sweets and snacks, more particularly to a combinatorial weighing device suitable for use in mixing and weighing small quantities of different kinds of articles that range in a wide variety.

BACKGROUND ART

Patent document 1 describes an example of combinatorial weighing devices designed to mix and weigh different kinds of articles. The combinatorial weighing device described in this patent document is equipped with: a plurality of weighing units each having a supply hopper and a weighing hopper that are vertically disposed; and supply units that supply these weighing units with articles to be weighed. This device may be called a combinatorial weighing device of horizontal arrangement, in which the weighing units and the supply units are linearly arranged next to each other.

Patent document 2 describes another example of such combinatorial weighing devices. The combinatorial weighing device described in this patent document is equipped with: a dispersing feeder formed in a conical shape that receives supplied articles and transports the received articles outward; and weighing units each having a supply hopper and a weighing hopper. This combinatorial weighing device may be called a weighing device of circular arrangement in which the weighing units are arranged around the dispersing feeder along its circumference.

When an operator wants to handle a broader range of articles to be mixed and weighed with this weighing device in which the weighing units are circularly arranged, the operator may need to diametrically enlarge the dispersing feeder and thereby secure more space in all directions around this feeder, so that more weighing units including supply hoppers and weighing hoppers can be arranged circumferentially around the dispersing feeder.

When a broader range of articles should be mixed and weighed with the weighing device of horizontal arrangement, on the other hand, the weighing units and the supply units that are linearly arranged may be simply increased in the directions of their linear arrangement. The weighing devices of this type, therefore, may be allowed to have a relatively flat and compact structure, as compared to the combinatorial weighing devices of circular arrangement.

CITATIONS LIST

Patent Document

Patent Document 1: Japanese Unexamined Patent Publication No. 2018-77074
Patent Document 2: Japanese Unexamined Patent Publication No. 2012-237576

SUMMARY OF INVENTION

Technical Problems

In the horizontal combinatorial weighing device described in Patent Document 1, articles to be weighed are supplied from the retaining hopper of the supply unit into the supply feeder, and then transported by the supply feeder into the supply hopper of the weighing unit.

When the retaining hopper is short of the articles in this weighing device, the weighing device may have to be manually resupplied with articles. Under such circumstances, the retaining hopper may desirably have a greater capacity that can afford to retain as many articles as possible in order to automatically operate the device for long hours without manpower.

The retaining hopper, if designed to have a greater capacity for more articles to be retained, may be fully filled with articles at one stage or may have fewer articles left therein at another stage. The articles discharged from the retaining hopper into the supply feeder may be thus variable in quantity from one stage to another, depending on the quantity of articles currently retained in the retaining hopper. Supposing that the supply feeder is driven to operate in such a device by a constant vibration strength in an attempt to continuously transport the articles at close intervals, the articles being transported, as they are becoming fewer and fewer in the retaining hopper, may be further spaced apart from each other.

With more intervals between the articles being transported, i.e., with more time slots in which no article is transported, the supply feeder may be more often empty at its article-outgoing end through which the articles are discharged, and the supply hopper may fail to receive any article from the supply feeder. During a certain weighing cycle(s), therefore, the weighing hopper may be unsupplied with the articles from the supply hopper.

As a result of the weighing hopper failing to receive any article during a weighing cycle(s), the number of hoppers available for combinatorial computations may decrease, leading to a poor combinatorial accuracy. Otherwise, combinatorial computations per se may become impossible, in which case the articles may fail to be discharged during certain weighing cycles, inviting a poor production yield.

The present invention was accomplished to address these issues of the known art and is directed to minimizing the risk of any feeders being empty at their article-outgoing ends in spite of variability of articles suppliable to the feeders.

Technical Solutions

To this end, the present invention provides the following technical features.

1) A combinatorial weighing device according to the present invention is provided with: a linear feeder that vibrationally transports an article from an upstream side to a downstream side in a direction of transport; a controller in charge of drive control of the linear feeder; and an article detector that detects whether the article is currently present at a downstream end of a trough of the linear feeder in the direction of transport. The combinatorial weighing device is further characterized in that the controller changes a vibration strength by which the linear feeder is driven to operate depending on whether the article detector is detecting the article at the downstream end of the trough.

According to the present invention, the vibration strength of the liner feeder is changed depending on whether the article detector is detecting any article at the downstream end of the trough of the linear feeder, i.e., whether any article is currently present at the downstream end of the trough of the linear feeder. When the articles continue to be vibrationally transported, arriving continuously at the downstream end of the linear feeder, the vibration strength may be set to a suitable degree of vibration strength that allows the articles to be discharged from the downstream end. When there is no article currently present at the downstream end of the trough of the linear feeder, for example, when the articles supplied into the linear feeder change in quantity and are accordingly spaced apart at intervals, thus failing to be continuously transported, the vibration strength may be set to such a suitable degree of vibration strength that narrows the intervals between the articles, thereby allowing the articles that follow to swiftly arrive at the downstream end of the trough.

The articles supplied into the linear feeder may be variable in quantity. Yet, the combinatorial weighing device thus characterized may successfully avoid the risk of the trough being empty at its downstream end.

2) The combinatorial weighing device according to a preferred embodiment of the present invention may be further characterized in that the linear feeder is supplied with the article from a retaining hopper that retains and discharges the article, the linear feeder discharges the article at the downstream end of the trough into a supply hopper, the controller sets, as the vibration strength by which the linear feeder is driven to operate when the article detector is detecting the article at the downstream end of the trough, a first vibration strength for discharge of the article into the supply hopper, and the controller sets, as the vibration strength by which the linear feeder is driven to operate when the article detector is not detecting the article at the downstream end of the trough, a second vibration strength for transport of the article to the downstream end of the trough.

The articles supplied from the retaining hopper into the linear feeder may be variable in quantity depending on the quantity of articles remaining in the retaining hopper. According to this embodiment, however, the first vibration strength; a suitable degree of vibration strength that allows the articles to be discharged from the downstream end of the trough of the linear feeder into the supply hopper, may be employed when any article is currently present at the downstream end. When, on the other hand, there is no article currently present at the downstream end of the trough of the linear feeder since the articles being vibrationally transported by the linear feeder are spaced apart at intervals, the second vibration strength may be employed to narrow the intervals between the articles, thereby allowing the articles that follow to swiftly arrive at the downstream end of the trough.

The articles supplied into the linear feeder may be variable in quantity. Yet, the combinatorial weighing device thus characterized may successfully avoid the risk of the trough being empty at its downstream end, i.e., the risk of failure to discharge the articles from the linear feeder into the supply hopper.

3) The combinatorial weighing device according to another embodiment of the present invention may be further characterized in that the controller, when the article detector is not detecting the article, drives the linear feeder to operate by the second vibration strength until the article is detected by the article detector.

According to this embodiment, when no article is being detected by the article detector, meaning that there is currently no article at the downstream end of the trough of the linear feeder, the linear feeder is driven to operate by the second vibration strength; a degree of vibration strength suitable for transport of the articles, until the articles arrive at the downstream end of the trough. This may allow the articles to be swiftly transported to the downstream end of the trough.

4) The combinatorial weighing device according to yet another embodiment of the present invention may be further provided with a weighing hopper that receives and weighs the article supplied from the supply hopper, and the controller executes combinatorial computations based on the article's weight obtained by the weighing hopper, selects a hopper to be an optimal combination as a result of the combinatorial computations and discharges the article from the selected hopper.

When there is currently no article at the downstream end of the trough of the linear feeder, the linear feeder is driven to operate by the second vibration strength suitable for transport of the articles to allow the articles to be swiftly transported to the downstream end of the trough. Thus, the downstream end of the trough may be prevented from becoming empty without any article being supplied, which may successfully avoid in any weighing cycle failure to supply the articles from the linear feeder into the supply hopper, i.e., failure to supply the articles from the supply hopper into the weighing hopper. This may reduce the risk of unfavorable events, for example, fewer hoppers than expected may only be available for combinatorial computations, resulting in a poor combinational accuracy, or the combinatorial computations per se may become impossible, inviting a poor production yield.

5) The combinatorial weighing device according to yet another embodiment of the present invention may be further characterized in that the linear feeder is a downstream linear feeder disposed on a downstream side in the direction of transport and supplied with the article from the retaining hopper through an upstream linear feeder disposed on an upstream side in the direction of transport, a plurality of sets of linear feeders are linearly arranged next to each other, the plurality of sets of linear feeders each including at least two linear feeders that are the upstream linear feeder and the downstream linear feeder, and a plurality of weighing units are linearly arranged next to each other, the plurality of weighing units each including the supply hopper and the weighing hopper that are vertically disposed, the supply hoppers being adapted to retain and discharge the articles supplied from the downstream linear feeders of the plurality of sets of linear feeders, the weighing hoppers being adapted to retain and weigh the articles discharged from the supply units.

According to this embodiment, the weighing units are provided that each include the supply hopper and the weighing hopper that are vertically disposed, and the weighing units are linearly arranged next to each other. Further, the plural sets of linear feeders are provided that supply the articles into the supply hoppers, and the linear feeders are linearly arranged next to each other. When an operator wants to use a greater number of weighing units to supply the supply hoppers with a broader range of articles, for example, the linear feeders and the weighing units, which are respectively linearly arranged, may be simply increased in the directions of their linear arrangement. Thus, it may become unnecessary to secure a large space in all directions around the dispersing feeder by increasing its diameter.

Effects of the Invention

According to the present invention, the vibration strength of the liner feeder is changeable depending on whether any article is currently present at the downstream end of the trough of the linear feeder. When the articles continue to be vibrationally transported, arriving continuously at the downstream end of the trough of the linear feeder, the vibration strength may be set to a suitable degree of vibration strength that allows the articles to be discharged from the downstream end. When there is currently no article at the downstream end of the trough of the linear feeder, for example, when the articles supplied into the linear feeder change in quantity and are not enough to be continuously transported, causing intervals between the articles being transported, the vibration strength may be set to such a suitable degree of vibration strength that narrows the intervals between the articles, thereby allowing the articles that follow to swiftly arrive at the downstream end of the trough.

In spite of possible variability in quantity of the articles supplied into the linear feeder, the downstream end of the trough may be prevented from becoming empty without any article being supplied.

DESCRIPTION OF EMBODIMENTS

Embodiments of the present invention are hereinafter described in detail with reference to the accompanying drawings.

Figure 1:
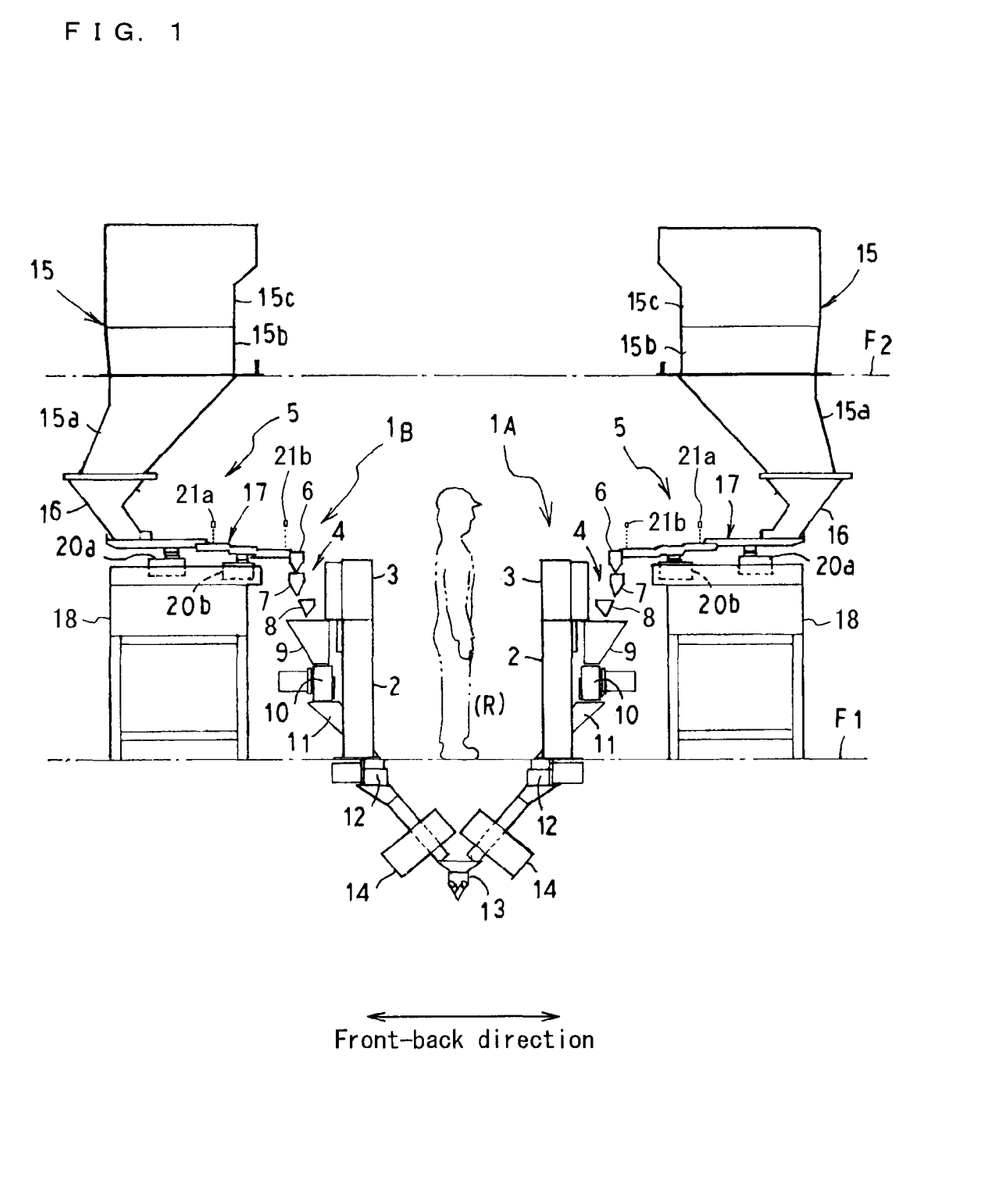
FIG. 1 is a schematic side view of a combinatorial weighing device according to an embodiment of the present invention.
Figure 2:
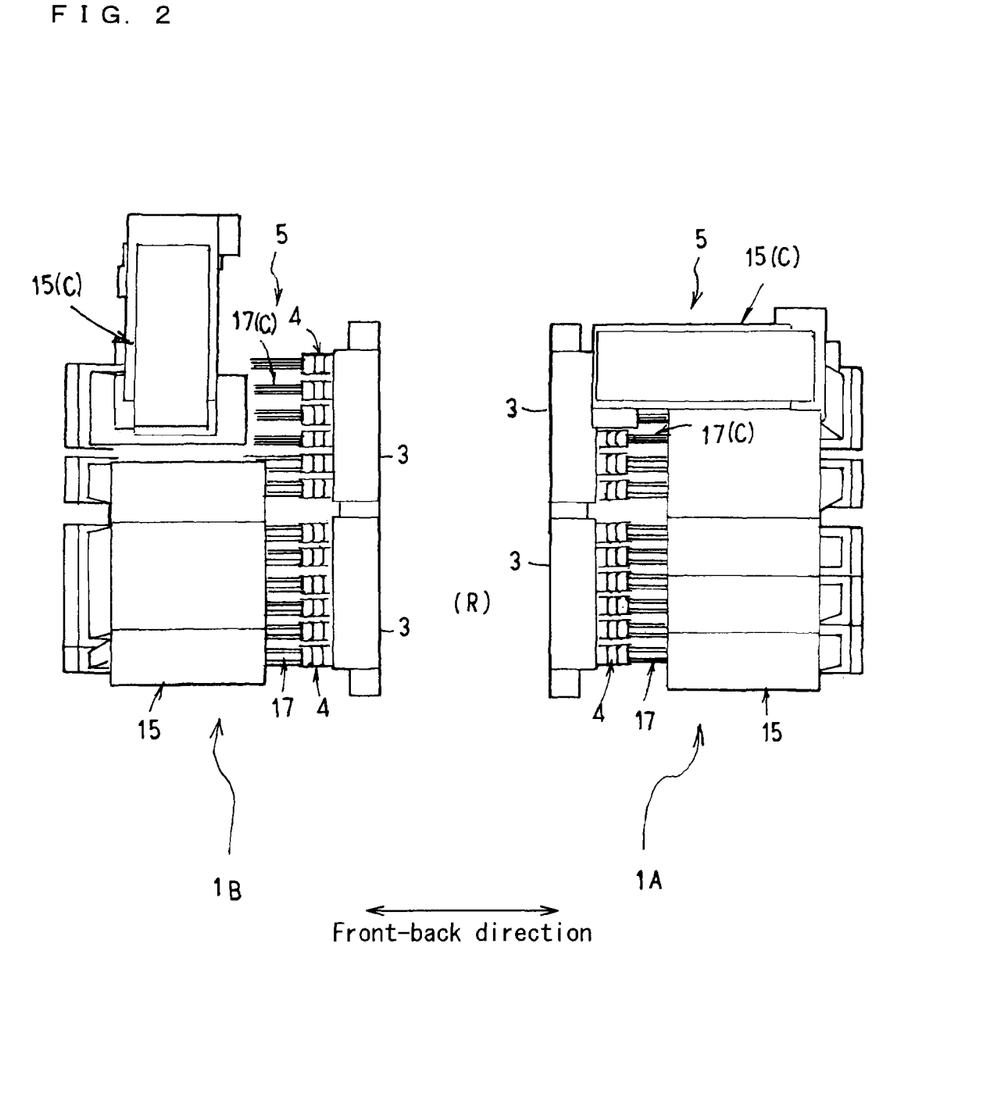
FIG. 2 is a schematic plan view of the combinatorial weighing device illustrated in FIG. 1.
Figure 3:
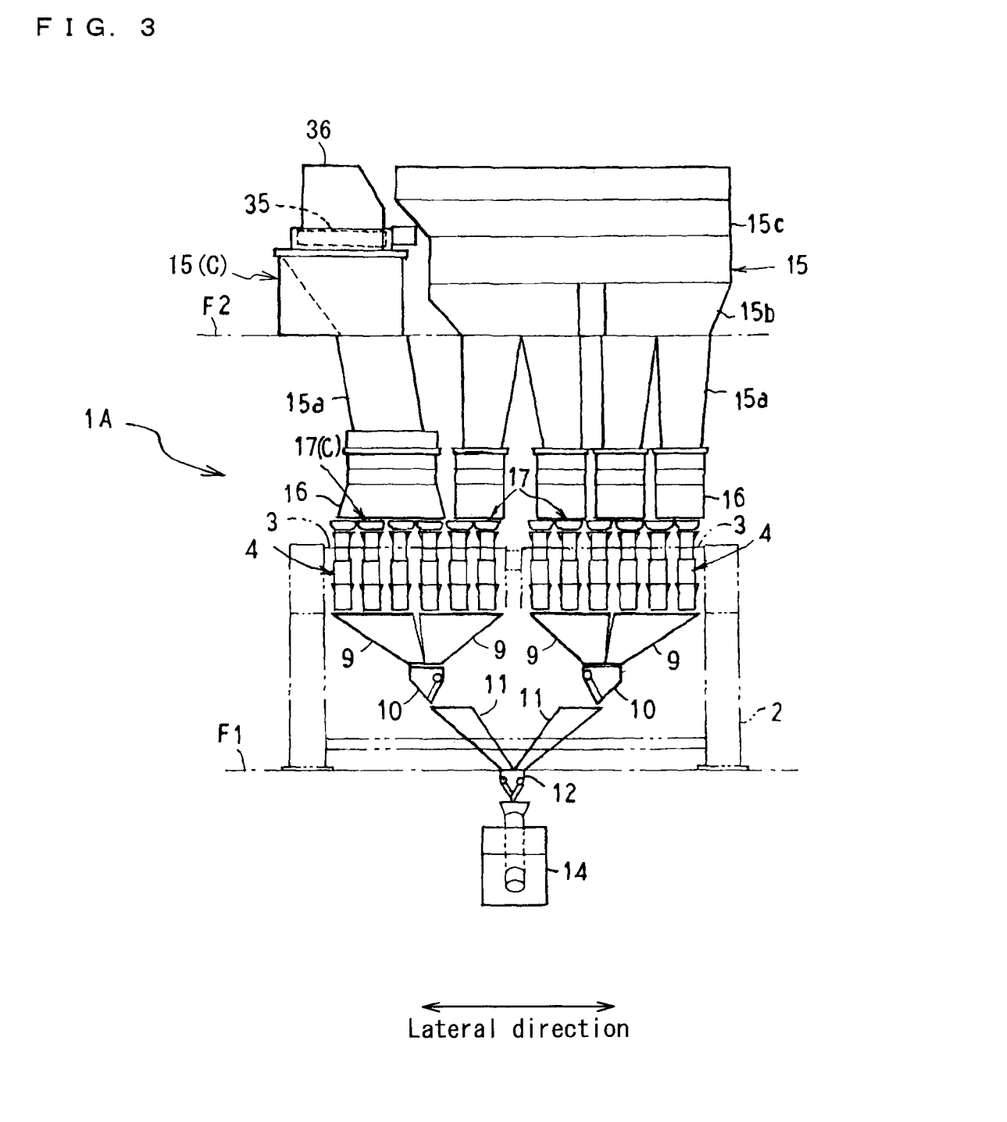
FIG. 3 is a schematic front view of one of weighing devices illustrated in FIG. 1.
Figure 4:
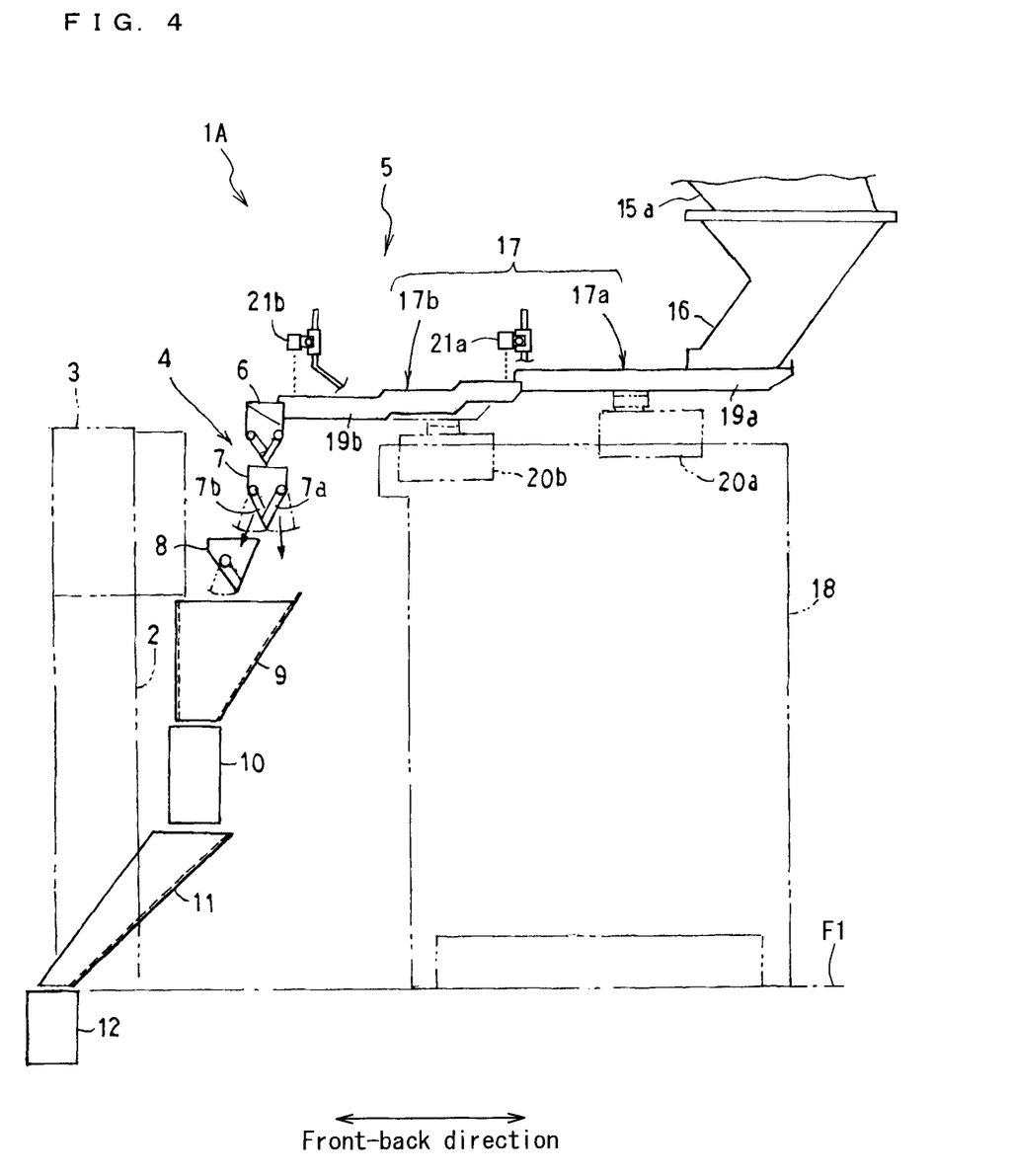
FIG. 4 is a side view of principal components of the weighing device illustrated in FIG. 3.

FIG. 1 is a side view of a combinatorial weighing device according to an embodiment of the present invention. FIG. 2 is a plan view of the combinatorial weighing device. FIG. 3 is a schematic front view of one of weighing devices illustrated in FIG. 1. FIG. 4 is a schematic side view of principal components of the weighing device illustrated in FIG. 3.

The combinatorial weighing device according to this embodiment is for use in mixing and weighing predetermined quantities of articles that range in a wide variety, for example, eight kinds of articles such as food stuffs including sweets. More specifically, this combinatorial weighing device may be suitably used to mix and weigh, for example, snacks to go with alcohol drinks in which nuts, bean snacks and/or cubic rice crackers are mixed into pouches with one or two small fishes cooked in mirin (sweet sake).

This combinatorial weighing device is installed on a first floor surface F1 for use in a packaging line, in which weighed articles are thrown in and packed into bags in a packaging apparatus, not illustrated in the drawing, located on a lower level than the floor surface.

For readability of this specification to better understand the structural features of this combinatorial weighing device, a front-back direction is hereinafter used to refer to the transverse direction on FIGS. 1, 2 and 4, and the direction from the near to far side on the drawing of FIG. 3. Further, a lateral direction is hereinafter used to refer to the direction from the near to far side on the drawings FIGS. 1 and 4, and the transverse direction on FIG. 3

As illustrated in FIGS. 1 and 2, the combinatorial weighing device includes a pair of weighing devices 1A and 1B. These weighing devices 1A and 1B are disposed on the front and back sides so as to face each other, with a central passage R being interposed therebetween. An operator of these weighing devices is allowed to move laterally, from right to left and vice versa, through this central passage R. The weighing devices 1A and 1B are essentially configured likewise, structural features of which are hereinafter described.

On the inner sides of the weighing devices 1A and 1B (on the sides of the central passage R), two bases 3, which are long members in the lateral direction, are each disposed on a support frame 2 and thereby stands to a predetermined height. On the outer sides of the bases 3 (on the sides opposite to the central passage R), multiple weighing units 4 are disposed in a row in the lateral direction. In the illustrated example, the weighing devices 1A and 1B are each equipped with 12 weighing units 4 that are lined up in a row. A wide variety of articles may be successfully mixed and weighed with these 24 weighing units 4, in total, of the weighing devices 1A and 1B.

An article supplier 5 is disposed on the outer side of the weighing units 4. The article supplier 5 supplies various kinds of articles to be weighed to positions above the weighing units 4.

The weighing units 4 are essentially configured as in the known art. The weighing units 4 each include a supply hopper 6, a weighing hopper 7, and a memory hopper 8. These hoppers 6, 7 and 8 are vertically disposed in a row and respectively have gates adapted to open and close. The supply hopper 6 receives articles transported from the article supplier 5 and then temporarily retains and discharges the received articles. The weighing hopper 7 retains the articles discharged from the supply hopper 6 and then weighs and discharges the retained articles. The memory hopper 8 receives the articles weighed by and discharged from the weighing hopper 7 and then temporarily retains and discharges the received articles.

The supply hopper 6, weighing hopper 7, and memory hopper 8 are detachably fitted to the base 3 as in the known art. In the base 3 are housed such devices as weight sensors used to measure the weights of the hoppers 6, 7, and 8, and mechanisms to open and close the gates of these hoppers.

As illustrated in FIG. 4, the weighing hopper 7 has, at its lower end, an outer gate 7a and an inner gate 7b that are adapted to independently open and close. When the outer gate 7a alone is oscillated to open, the weighed articles are discharged into a first collection chute 9. When the inner gate 7b alone is oscillated to open, the weighed articles are discharged into and retained in the memory hopper 8.

The weighing units 4 are each equipped with a memory hopper 8. These memory hoppers 8, as well as the weighing hoppers 7, may be allowed to participate in combinatorial computations. Thus, more hoppers may be available for combinatorial computations (available hoppers).

At positions below the weighing hoppers 7 and the memory hoppers 8, four first collection chutes 9 are disposed in a row in the lateral direction. These first collection chutes 9 collect the articles dropping downward from the weighing hoppers 7 or the memory hoppers 8 determined and selected as having a predetermined combined weight by the combinatorial computations. Two first collection hoppers 10 are each disposed at a position below two adjacent ones of the first collection chutes 9. These first collection hoppers 10 temporarily receive and retain the articles collected by the first collection chutes 9. Two second collection chutes 11 are disposed at positions below the first collection hoppers 10. These second collection chutes 11 guide and collect the articles dropping downward from the first collection hoppers 10.

In a respective one of the weighing devices 1A and 1B, a second collection hopper 12 is disposed at a position below the second collection chutes 11. In the second collection hopper 12 are gathered together and temporarily retained the articles weighed and collected by the 12 weighing units 4.

As illustrated in FIG. 1, a final collection hopper 13 is disposed at a position down below the central passage R. In the final collection hopper 13 are gathered together the articles discharged from the second collection hoppers 12 of both of the weighing devices 1A and 1B. This final collection hopper 13 is opened and closed in response to a supply request instruction outputted from the packaging apparatus. A metal detector 14 is disposed in a guiding path through which the articles dropping downward from the second collection hopper 12 into the final collection hopper 13. The metal detector 14 monitors whether the articles are contaminated with any metallic foreign matter.

The article supplier 5 has retaining tanks 15 in which the articles are retainable, and retaining hoppers 16 continuous to lower ends of the retaining tanks 15. The article supplier 5 further has 12 supply feeders 17. The supply feeders 17 are disposed next to each other in the lateral direction at positions above a support table 18. The supply feeders 17 vibrationally transport the articles dropping downward from lower ends of the retaining hoppers 16 into the 12 weighing units 4.

The retaining tanks 15 include a lower-stage tank 15a, a mid-stage tank 15b, and an upper-stage tank 15c. The lower-stage tank 15a is fitted into and supported by the opening of a second floor surface F2 located at a position way above the first floor surface F1. The mid-stage tank 15b is detachably and supportably fitted to an upper part of the lower tank 15a, and the upper-stage tank 15c is attached likewise to an upper part of the mid-stage tank 15b.

As illustrated in FIGS. 2 and 3, a retaining tank 15(C), which is configured differently to the other tanks, is also provided in order to supply sticky articles, for example, small rice crackers or small fishes cooked in mirin (sweet sake). This retaining tank 15(C) is equipped with a belt conveyer 35, as illustrated in FIG. 3. By rotating the belt conveyer 35, the articles retained in an upper tank 36 are transported and dropped downward into the retaining hopper 16 through the lower-stage tank 15a.

As illustrated in FIG. 4, the supply feeder 17 includes two linear feeders; an upstream linear feeder 17a, and a downstream linear feeder 17b. The upstream linear feeder 17a and the downstream linear feeder 17b are disposed in tandem, with the upstream linear feeder being located higher than the other, like a stepwise slope directed downward. These linear feeders 17a and 17b respectively have troughs 19a and 19b and vibration generating mechanisms 20a and 20b. The troughs 19a and 19b are shaped in the form of a groove in cross section. The vibration generating mechanisms 20a and 20b are disposed at upper positions of the support table 18.

The articles thrown out of the retaining hopper 16 into the upstream linear feeder 17a are vibrationally transported into the downstream linear feeder 17b. Then, the articles are thrown, by a small amount at a time, out of the article-outgoing end of the downstream linear feeder 17b into the supply hopper 6 of the weighing unit 4.

An upstream article sensor 21a and a downstream article sensor 21b are disposed at positions above the supply feeder 17. These article sensors 21a and 21b may detect, using, for example, laser, heights of the articles piled up at the upstream article-incoming end and the downstream article-outgoing end of the lower-stage linear feeder 17b. The linear feeders 17a and 17b are driven to operate, as described later, based on information of article detection outputted from the article sensors 21a and 21b.

Figure 5:
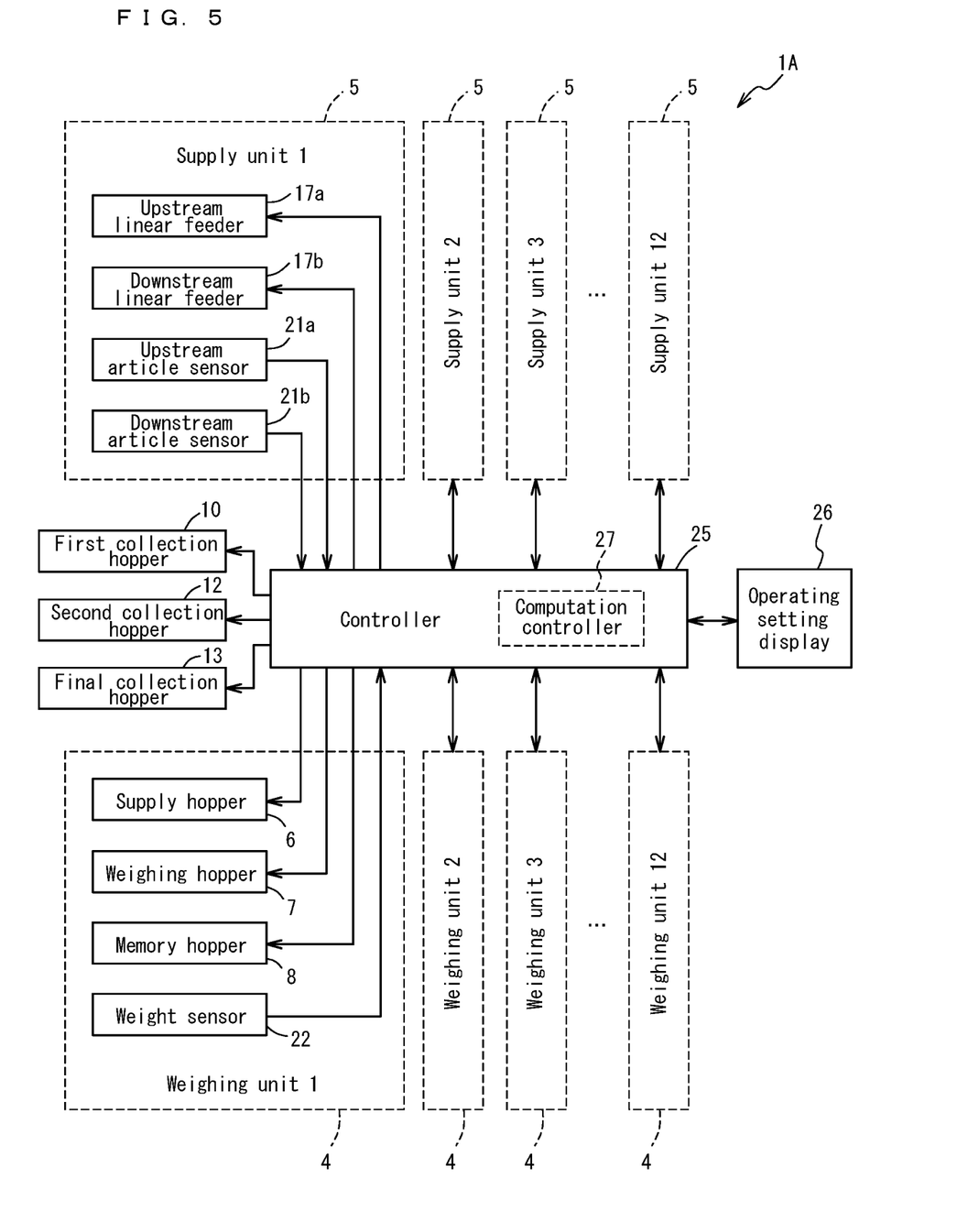
FIG. 5 is a control block diagram of principal components in one of the weighing devices; a combinatorial weighing device 1A, illustrated in FIG. 1.

FIG. 5 is a control block diagram of principal components in the combinatorial weighing device 1A; one of the weighing devices according to this embodiment. The weighing device 1A and the other weighing device 1B are essentially configured likewise. This weighing device 1A, therefore, is typically illustrated in this drawing. In FIG. 5, principal components of the article supplier 5 that supplies a respective one of the weighing units 4 with articles are collectively illustrated as a supply unit.

A controller 25 that controls the components and units of the combinatorial weighing device is housed in the base 3. The controller 25 is connected to an operation setting display 26 on which operation settings for the weighing device 1A are displayable, for example, parameters and measured values. To the controller 25 are inputted results of detection outputted from the upstream and downstream article sensors 21a and 21b of the supply units and weight signals outputted from weight sensors 22 that measure weights of the weighing hoppers 7. The controller 25 is in charge of drive controls of the upstream and downstream linear feeders 17a and 17b of the supply units, and also opens and closes the discharge gates of the hoppers 6, 7, 8, 10, 12 and 13.

In this embodiment, the weighing devices 1A and 1B are connected to each other with a LAN cable. An operator, by manipulating the operation setting display 26, can selectively set which one of the weighing devices 1A and 1B should be the main device. When the weighing device 1A is set as the main device, for example, a computation controller 27 of the controller 25 in the main weighing device 1A executes combinatorial computations based on weights of the articles in the hoppers 7 and 8; 24 hoppers in total, of the weighing devices 1A and 1B, and then prompts the weighing hoppers 7 and the memory hoppers 8 of the weighing device 1A, 1B, which were determined and selected as an optimal combination by the combinatorial computations, to discharge the articles.

Figure 6:
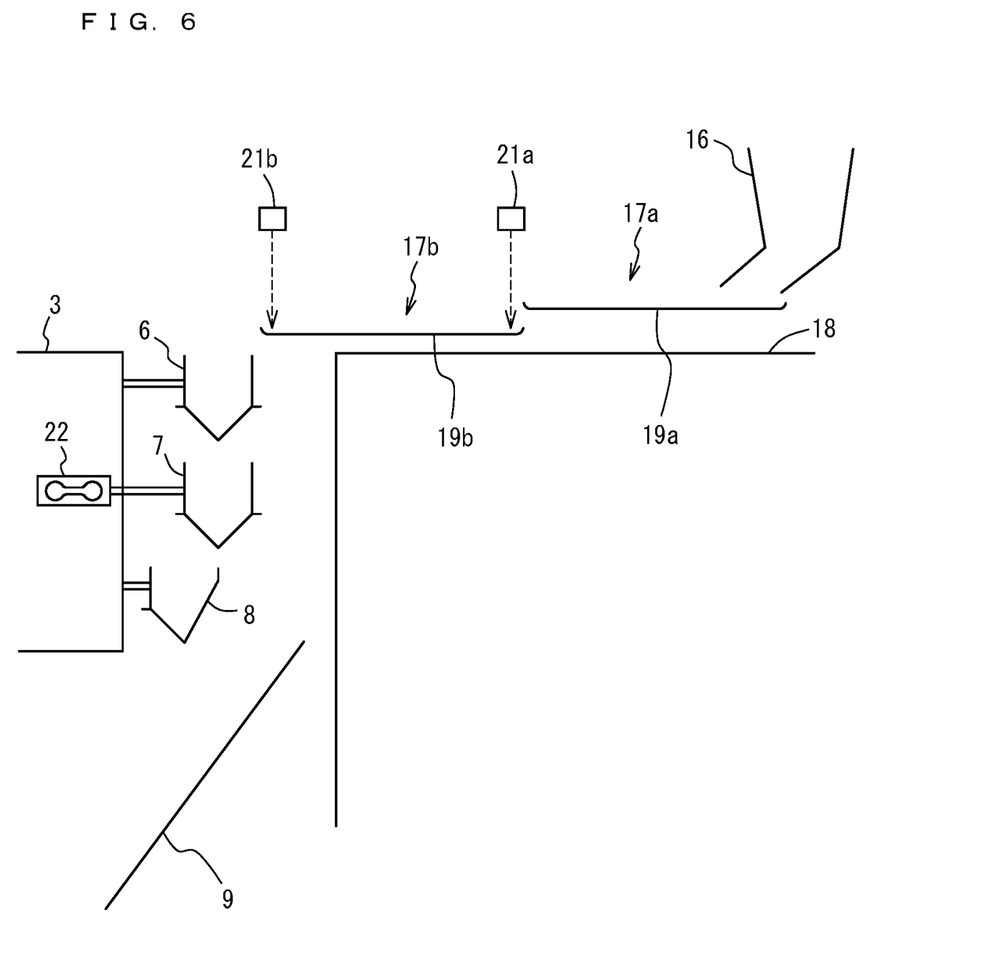
FIG. 6 is a schematic side view of the combinatorial weighing device illustrated in part in the vicinity of linear feeders and weighing units.

FIG. 6 is a schematic side view that illustrates the combinatorial weighing device in part in the vicinity of the linear feeders 17a and 17b and the weighing units 4.

As described earlier, the upstream article sensor 21a is disposed at a position above the upstream article-incoming end of the trough 19b of the downstream linear feeder 17b. This article sensor detects, with laser, the articles supplied into the trough 19b of this downstream linear feeder. Further, the downstream article sensor 21b is disposed at a position above the downstream article-outgoing end of the trough 19b of the downstream linear feeder 17b. This article sensor detects, with laser, the articles at the article-outgoing end of the trough 19 of this downstream linear feeder.

The articles in the retaining hopper 16 are discharged, through vibration generated by the upstream linear feeder 17a, into the trough 19a of the upstream linear feeder 17a and are further vibrationally transported toward the downstream side in the direction of transport. Then, the articles are transported out of the article-outgoing end of the trough 19a of the upstream linear feeder 17a, arriving at the article-incoming end of the trough 19b of the downstream linear feeder 17b. The articles that arrived at the article-incoming end of the trough 19b of the downstream linear feeder 17b are then transported to the article-outgoing end of the trough 19b of the downstream linear feeder 17b. In response to the output of an instruction to transport the articles to the supply hopper 6, the articles at the article-outgoing end of the trough 19b are discharged into the supply hopper 6. The articles in the supply hopper 6 are thrown into the weighing hopper 7, and the articles, after being weighed by the weight sensor 22, are discharged out of the weighing hopper 7 into the memory hopper 8 or into the first collection chute 9.

Next, drive controls of the upstream linear feeder 17a and the downstream linear feeder 17b are hereinafter described with reference to FIGS. 7A and 7B in which FIG. 6 is illustrated in part.

Figure 7A:
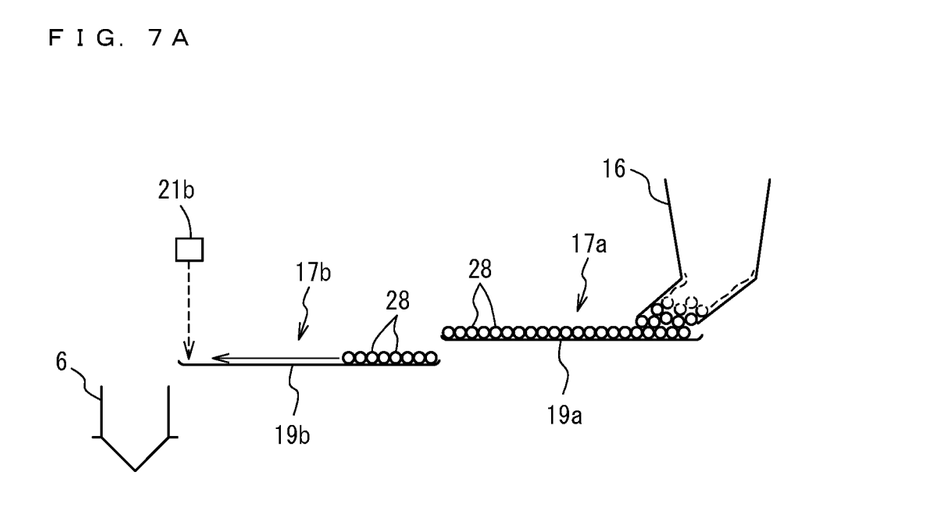
FIG. 7A is a side view of FIG. 6 in part that illustrates drive controls of the linear feeders.

When no article 28 is being detected at the downstream article-outgoing end of the trough 19b of the downstream linear feeder 17b by the downstream article sensor 21b, i.e., when there is no article 28 currently present at the downstream end of the trough 19b, as illustrated in FIG. 7A, the downstream linear feeder 17b continues to be driven to operate until any article 28 is detected by the downstream article sensor 17b. The articles 28 are thus transported to the downstream end of the trough 19b.

When any article 28 is being detected at the downstream end of the trough 19 of the downstream linear feeder 17b by the downstream article sensor 21b, i.e., when any article 28 is found to be currently present at the downstream end of the trough 19b, the downstream linear feeder 17b is driven to operate in response to the output of an instruction to transport the articles to the supply hopper 6. The articles 28 at the downstream end of the trough 19 are thus discharged into the supply hopper 6.

Figure 7B:
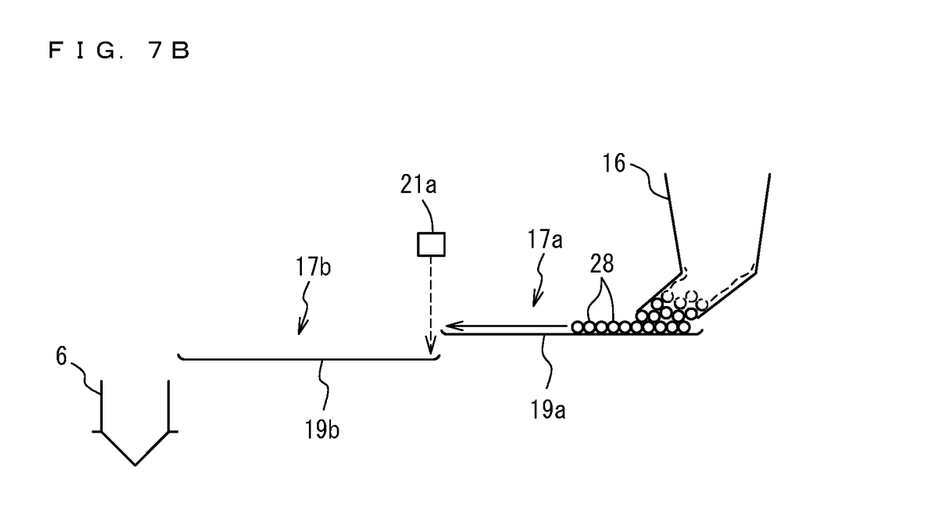
FIG. 7B is a side view of FIG. 6 in part that illustrates drive controls of the linear feeders.

When no article 28 is being detected at the upstream article-incoming end of the trough 19b of the downstream linear feeder 17b by the upstream article sensor 21a, i.e., when there is no article 28 currently present at the upstream end of the trough 19b, as illustrated in FIG. 7B, the upstream linear feeder 17a continues to be driven until any article 28 is detected by the upstream article sensor 17a. The articles 28 in the trough 19a of the upstream linear feeder 17a are thus transported into the trough 19b of the downstream linear feeder 17b. The upstream linear feeder 17a ceases to be driven when the articles 28 are supplied into the trough 19b of the downstream linear feeder 17b and are detected at the upstream end of the trough 19b by the upstream article sensor 21a.

As described thus far, the articles in the retaining hopper 16 are transported by the linear feeders 17a and 17b from the upstream side toward the downstream side and are thrown into the supply hopper 6 of the weighing unit 4.

The articles supplied from the retaining hopper 16 into the upstream linear feeder 17a may possibly change in quantity, and the articles supplied from the upstream linear feeder 17a into the downstream linear feeder 17b may correspondingly change in quantity. Yet, this embodiment provides the following technical features to ensure stable supply of the articles under such circumstances.

Figure 8A:
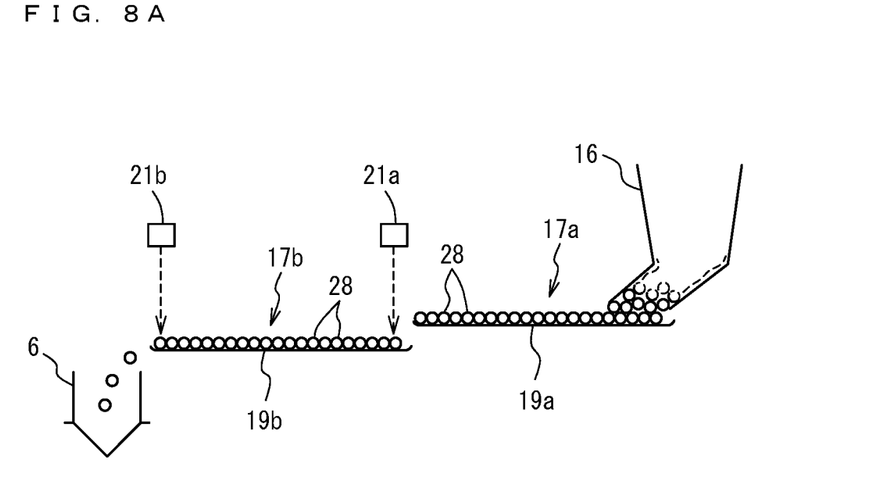
FIG. 8A is a side view of FIG. 6 in part that illustrates a state of supply of articles using the linear feeders.

When any article is being detected at the downstream end of the trough 19b of the downstream linear feeder 17b by the downstream article sensor 21b, for example, when the articles 28 continue to be transported, arriving continuously at the downstream end of the trough 19b of the downstream linear feeder 17b, as illustrated in the side view of FIG. 8A, the downstream linear feeder 17b is driven to operate in response to the output of an instruction to transport the articles to the supply hopper 6. The downstream linear feeder 17b thus driven starts to discharge the articles 28 into the supply hopper 6.

In this embodiment, the vibration strength of the downstream linear feeder 17b when the articles 28 are discharged from the downstream linear feeder 17b into the supply hopper 6 is set to a first vibration strength that suitably allows the articles 28 to be discharged. This first vibration strength may be referred to as "push-out strength". This "push-out strength" thus suitable for discharge of the articles may prevent oversupply of the articles from the downstream linear feeder 17b into the supply hopper 6.

The vibration strength may be set to different levels in stages by manipulating the operation setting display 26. The push-out strength and a transport strength described below are previously set depending on, for example, properties of the articles to be weighed.

Figure 8B:
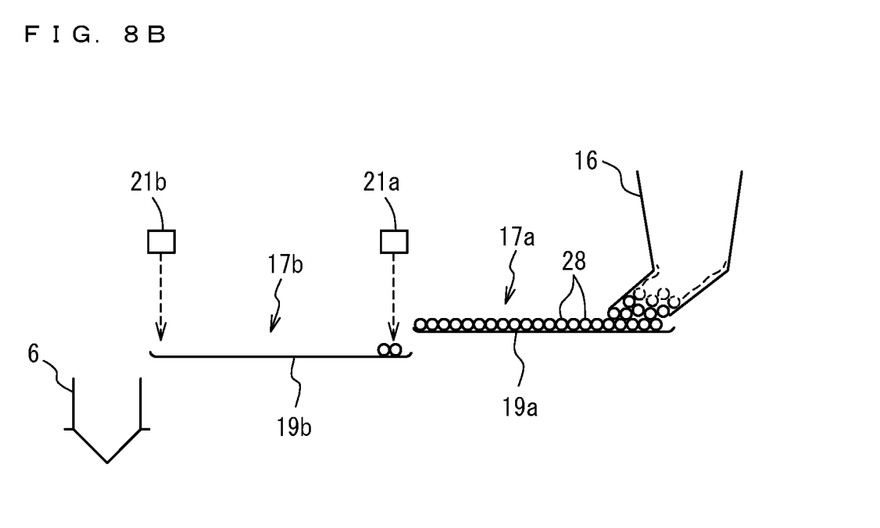
FIG. 8B is a side view of FIG. 6 in part that illustrates a state of supply of articles using the linear feeders.

When no article is being detected by the downstream article sensor 21b at the downstream end of the trough 19b of the downstream linear feeder 17b, for example, when the articles supplied from the upstream linear feeder 17a are becoming fewer, causing delayed arrival of the articles that follow at the downstream end of the trough 19b of the downstream linear feeder 17b, as illustrated in FIG. 8B, the downstream linear feeder 17b continues to be driven until any article is detected by the downstream article sensor 21b.

In this embodiment, the downstream linear feeder 17b at the time is driven to operate by a transport strength that differs from the push-out strength; a vibration strength suitable for transport of the articles, until any article is detected by the downstream article sensor 21b.

The downstream linear feeder 17b, when there is currently no article at the downstream end of the trough 19b of this linear feeder, is driven to operate by the transport strength; vibration strength suitable for transport of the articles, to allow smooth transport of the articles on the upstream side of the trough 19b toward the downstream side.

When the articles supplied from the retaining hopper 16 into the upstream linear feeder 17a are becoming fewer, causing intervals between the articles supplied into the downstream linear feeder 17b, the downstream linear feeder 17b is driven to operate by the vibration strength suitably set to transport the articles. This may narrow such intervals between the articles being transported, enabling speedy supply of the articles to the downstream end of the trough 19b of the downstream linear feeder 17b.

The operation of the combinatorial weighing device according to this embodiment is hereinafter described with reference to the flow charts of FIGS. 9 and 10.

Figure 9:
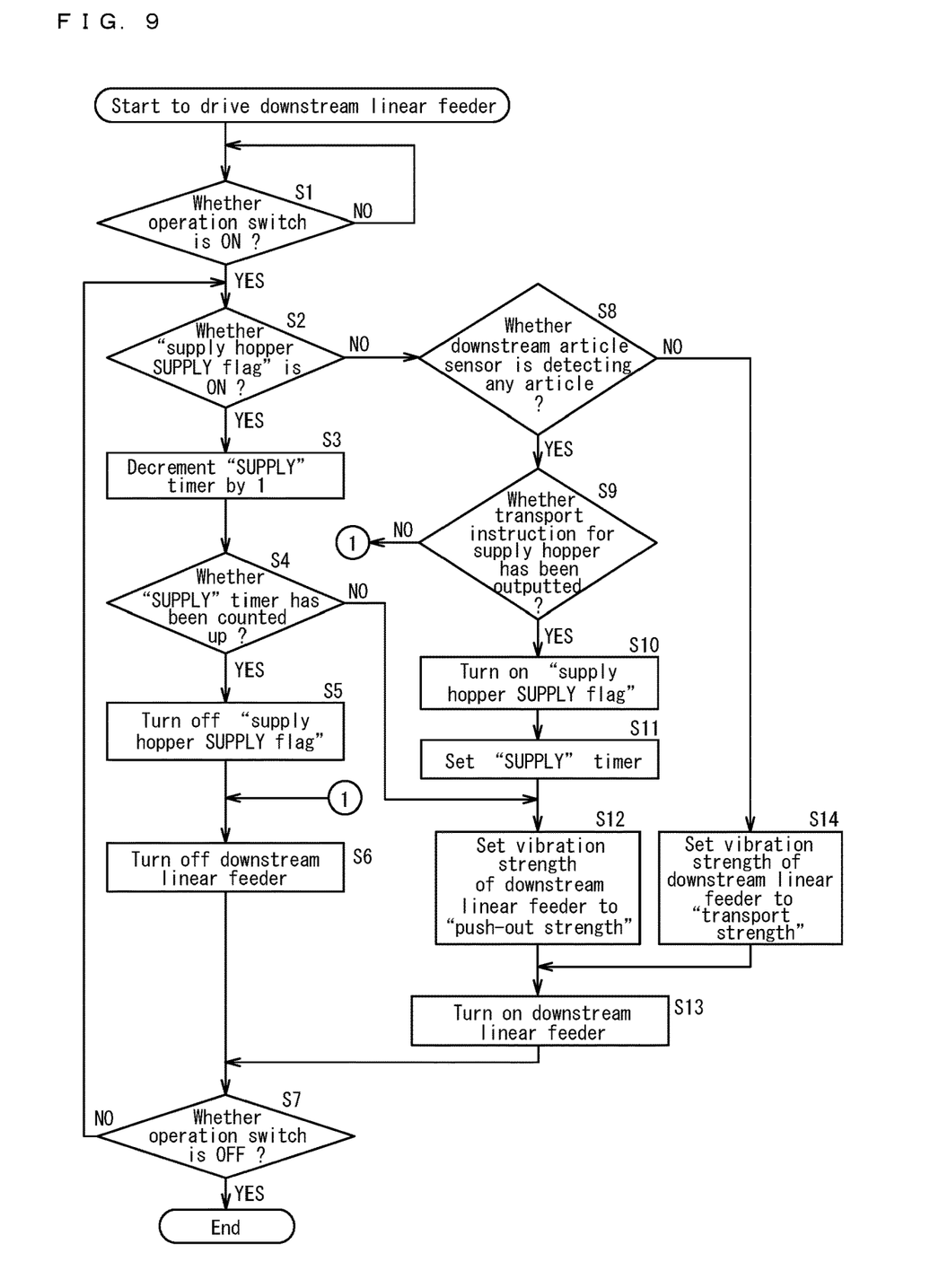
FIG. 9 is a flow chart illustrating steps of an exemplified control process executed by a downstream linear feeder.

FIG. 9 is a flow chart illustrating steps of an exemplified control process executed by the downstream linear feeder. FIG. 10 is a flow chart illustrating steps of an exemplified control process executed by the upstream linear feeder. In these drawings are illustrated programs that are both executed at certain time intervals, for example, per 10 msec.

To start with, when an operation switch is determined as ON (Step S1), as illustrated in FIG. 9, it is determined whether the following flag has been turned on; a "supply hopper SUPPLY flag" indicating that the supply hopper 6 is currently supplied with articles (Step S2). When Step S2 determines that the "supply hopper SUPPLY flag" is ON, which indicates that the articles are currently supplied, the count value of a "SUPPLY" timer that measures the duration of ongoing supply is decremented by "1" (Step S3), and it is determined whether the "SUPPLY" timer has been counted up (Step S4). When Step S4 determines that the "SUPPLY" timer has been counted up, which indicates that supply of the articles into the supply hopper 6 is over, the "supply hopper SUPPLY flag" is turned off (Step S5), and the downstream linear feeder 17b ceases to be driven (turned off). Then, the control process proceeds to Step S7 (Step S6). In Step S7, it is determined whether the operation switch has been turned off. When Step S7 determines that the operation switch has not been turned off, the control process returns to Step S2 (Step S7).

When Step S2 determines that the "supply hopper SUPPLY flag" is not ON, it is determined whether any article has been detected by the downstream article sensor 21b (Step S8).

When Step S8 determines that any article is being detected, it is determined whether an instruction to transport the articles to the supply hopper 6 has been outputted (Step S9). In the case of no instruction to transport the articles to the supply hopper 6, the control process proceeds to Step S6.

When Step S9 determines that the instruction to transport the articles to the supply hopper 6 has been outputted, the "supply hopper SUPPLY flag" is turned on, and the control process proceeds to Step S11 (Step S10). In Step S11, the "SUPPLY" timer is set. Then, the vibration strength of the downstream linear feeder 17b is set to the push-out strength; vibration strength suitable for discharge (Step S12), and the downstream linear feeder 17b starts to be driven (turned on) by the push-out strength (Step S13). Then, the control process proceeds to Step S7.

When Step S8 determines that no article is being detected by the downstream article sensor 21b, the vibration strength of the downstream linear feeder 17b is set to the transport strength; second vibration strength suitable for transport, to enable speedy transport of the articles to the downstream end of the trough 19b of the downstream linear feeder 17b. The control process then proceeds to Step S14, in which the downstream linear feeder 17b starts to be driven by the transport strength (Step S13), and the control process proceeds to Step S7.

Figure 10:
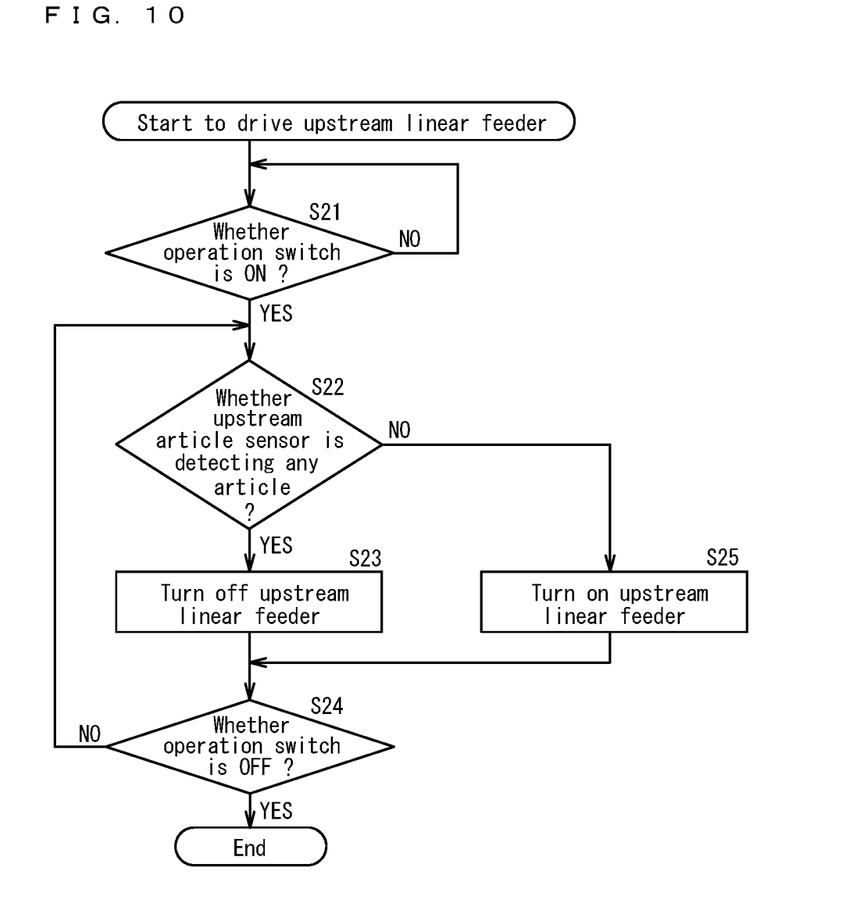
FIG. 10 is a flow chart illustrating steps of an exemplified control process executed by an upstream linear feeder.

The control process for the upstream linear feeder 17a illustrated in FIG. 10 is hereinafter described. When the operation is determined as ON (Step S21), it is determined whether any article has been detected by the upstream article sensor 21a (Step S22). When Step S22 determines that any article is being detected, the upstream linear feeder 17a ceases to be driven (Step S23). When it is determined that the operation switch has not been turned off, the control process returns to Step S22 (Step S24).

When Step S22 determines that no article has been detected by the upstream article sensor 21a, the upstream linear feeder 17a starts to be driven, and the control process proceeds to Step S24b (Step S25).

According to this embodiment, when the articles are currently at the downstream end of the trough 19b of the downstream linear feeder 17b, the push-out strength may be suitably employed. In the absence of any article at the downstream end of the trough 19b of the downstream linear feeder 17b, the transport strength suitable for transport may be employed to allow the articles that follow to speedily arrive at the downstream end of the trough 19b.

The articles supplied into the downstream linear feeder 17b may possibly be variable in quantity. Yet, the embodiment described above may prevent possible failure to supply the articles from the downstream linear feeder 17b into the supply hopper 6, thereby avoiding in any weighing cycle that no article is supplied from the supply hopper 6 into the weighing hopper 7. This may reduce the risk of unfavorable events, for example, fewer hoppers than expected may only be available for combinatorial computations, resulting in a poor combinational accuracy, or the combinatorial computations per se may become impossible, inviting a poor production yield.

OTHER EMBODIMENTS

1) The weighing device according to the embodiment described thus far may be useful in mixing and weighing articles that range in a wide variety. Optionally, this weighing device with a reduced number of sets of hoppers may be applicable for use in mixing and weighing a single type of articles.
2) In the embodiment described earlier, the memory hoppers are added to the weighing units to increase the number of available hoppers that can participate in combinatorial computations. In this weighing device, however, the memory hoppers may be dispensable components.

REFERENCE SIGNS LIST 1A, 1B weighing device
4 weighing unit
5 article supplier
6 supply hopper
7 weighing hopper
8 memory hopper
15 retaining tank
17 supply feeder
17a upstream linear feeder
17b downstream linear feeder
19a, 19b trough
21a upstream article sensor
21b downstream article sensor
22 weight sensor
25 controller
26 operating setting display
27 computation controller

The invention claimed is:
1. A combinatorial weighing device comprising:
a linear feeder that vibrationally transports an article from an upstream side to a downstream side in a direction of transport; and
a controller in charge of drive control of the linear feeder; and
an article detector that detects whether the article is currently present at a downstream end of a trough of the linear feeder in the direction of transport,
the controller being configured to change a vibration strength by which the linear feeder is driven to operate depending on whether the article detector is detecting the article at the downstream end of the trough, wherein
the linear feeder is supplied with the article from a retaining hopper that retains and discharges the article, the linear feeder discharges the article at the downstream end of the trough into a supply hopper, the controller sets, as the vibration strength by which the linear feeder is driven to operate when the article detector is detecting the article at the downstream end of the trough, a first vibration strength for discharge of the article into the supply hopper, and the controller sets, as the vibration strength by which the linear feeder is driven to operate when the article detector is not detecting the article at the downstream end of the trough, a second vibration strength for transport of the article to the downstream end of the trough.

2. The combinatorial weighing device according to claim 1, wherein the controller, when the article detector is not detecting the article, drives the linear feeder to operate by the second vibration strength until the article is detected by the article detector.

3. The combinatorial weighing device according to claim 1 or 2, further comprising a weighing hopper that receives and weighs the article supplied from the supply hopper, wherein the controller executes combinatorial computations based on a weight of the article weighed by the weighing hopper, selects a hopper to be an optimal combination as a result of the combinatorial computations and discharges the article from the selected hopper.

4. The combinatorial weighing device according to claim 1 or 2, wherein the linear feeder is a downstream linear feeder disposed on a downstream side in the direction of transport and supplied with the article from the retaining hopper through an upstream linear feeder disposed on an upstream side in the direction of transport, a plurality of sets of linear feeders are linearly arranged next to each other, the plurality of sets of linear feeders each comprising at least two linear feeders that are the upstream linear feeder and the downstream linear feeder, and a plurality of weighing units are linearly arranged next to each other, the plurality of weighing units each comprising the supply hopper and the weighing hopper that are vertically disposed, the supply hoppers being adapted to retain and discharge the articles supplied from the downstream linear feeders of the plurality of sets of linear feeders, the weighing hoppers being adapted to retain and weigh the articles discharged from the supply units.

5. The combinatorial weighing device according to claim 3, wherein the linear feeder is a downstream linear feeder disposed on a downstream side in the direction of transport and supplied with the article from the retaining hopper through an upstream linear feeder disposed on an upstream side in the direction of transport, a plurality of sets of linear feeders are linearly arranged next to each other, the plurality of sets of linear feeders each including at least two linear feeders that are the upstream linear feeder and the downstream linear feeder, and a plurality of weighing units are linearly arranged next to each other, the plurality of weighing units each comprising the supply hopper and the weighing hopper that are vertically disposed, the supply hoppers being adapted to retain and discharge the articles supplied from the downstream linear feeders of the plurality of sets of linear feeders, the weighing hoppers being adapted to retain and weigh the articles discharged from the supply units.

\* \* \* \* \*